United States Patent

[11] 3,542,158

[72] Inventor Carter H. Arnold
  317 Rocky Point Road, Palos Verdes
  Estates, California 90274
[21] Appl. No. 733,170
[22] Filed May 29, 1968
[45] Patented Nov. 24, 1970

[54] FLEXIBLE LINE GRIPPING DEVICE
  9 Claims, 11 Drawing Figs.
[52] U.S. Cl. .................................................. 188/65.4;
  24/132; 182/5
[51] Int. Cl. .................................................... B65h 59/14
[50] Field of Search ........................................ 188/65.4,
  65.5; 182/5; 24/132FE, 133

[56] References Cited
  UNITED STATES PATENTS
  263,100  8/1882  Beebe .............................. 188/65.5
  583,776  7/1897  Szpor ............................... 188/65.5

Primary Examiner—George E. A. Halvosa
Attorney—Herzig & Walsh

ABSTRACT: The device of the invention is a mechanism capable of being locked or secured onto a flexible line, such as, for example, a rope. The gripping device may be locked to the line at any intermediate point without being threaded on from an end. The device locks onto the line or rope by applying a torque load to it and it releases by releasing the torque load. In a preferred form of the invention it takes the form of spaced members having a pair of pins or stems extending between them. One of these pins is removable and by removing it the rope to be gripped can be placed in the device between the pins. Preferably the side members are circular and swingably pivoted to them are side plates generally triangular in form, with rollers pivotally mounted between them which serve to guide the tension (safety) lines passing over peripheral grooves in the side members, whereby the device is rotated by a load on a safety line into gripping position, wherein the pins are moved in such a way as to form a locking hitch in the line or rope. Upon releasing the torque load on the safety lines (such as by manually applying a counter torque) the device rotates in the opposite direction so as to controllably release the locking hitch and to allow the device to be moved along the line or rope.

Patented Nov. 24, 1970

3,542,158

INVENTOR
CARTER H. ARNOLD
BY
Herzig & Walsh
ATTORNEYS

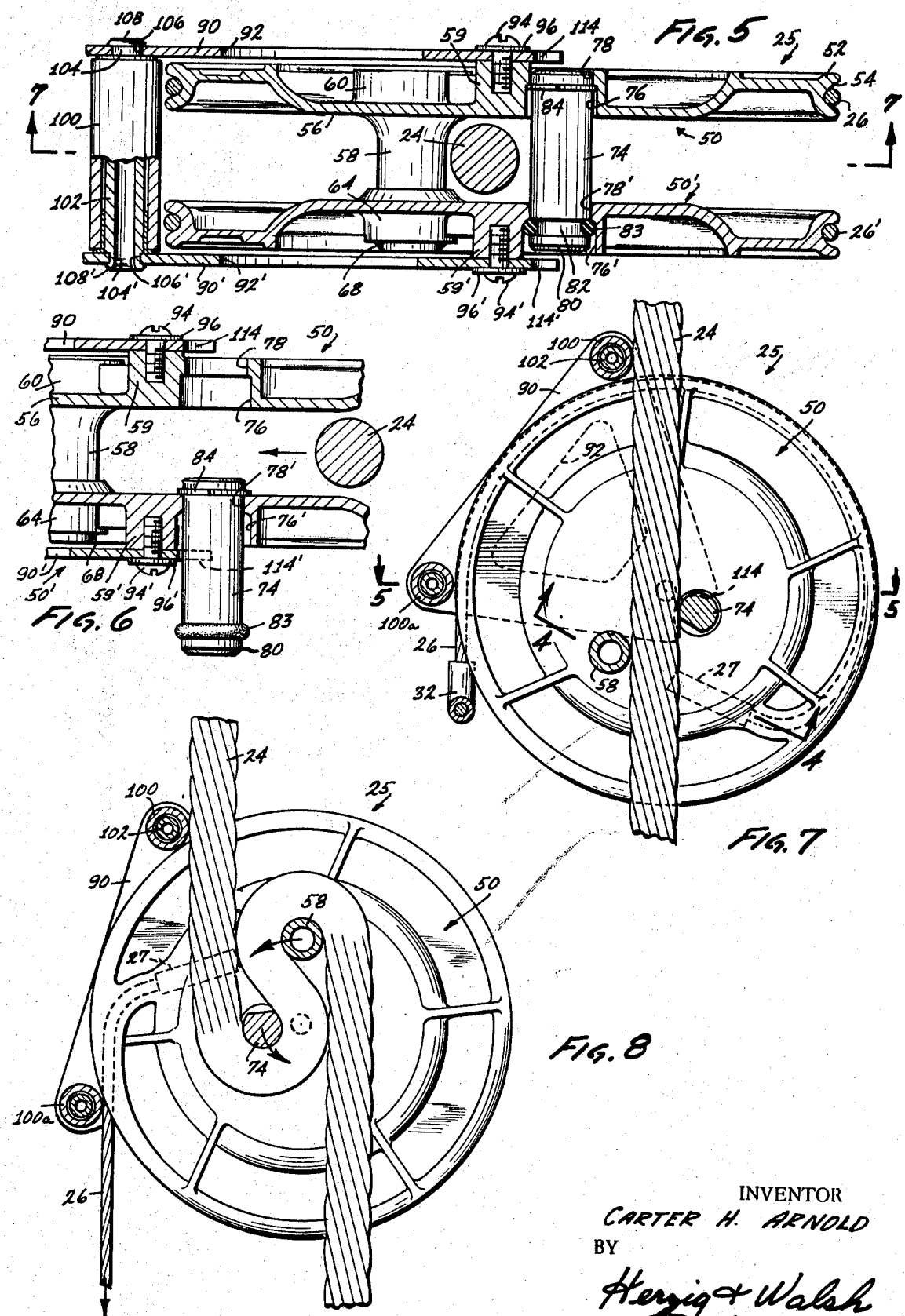

Patented Nov. 24, 1970

INVENTOR
CARTER H. ARNOLD
BY
Herzig + Walsh
ATTORNEYS

FLEXIBLE LINE GRIPPING DEVICE

SUMMARY OF THE INVENTION

The invention relates to a device for locking or gripping a line such as a rope at any intermediate point thereon. The device is attachable to the line or rope at any intermediate point without having to thread the rope through the device from an end thereof.

The device of the invention has utility from many standpoints, and its purposes are to realize the objects summarized hereinafter.

In a preferred form of the invention it takes the form of two side plates, preferably circular, forming in effect a wheel. Extending between these side plates at positions eccentric to the center are transverse pins or stems, one of which is removable. By removing one pin the rope to be gripped can be entered into the device between the pins.

The side plates have peripheral grooves over which pass parts of the load control line which attaches to the person or object which, if falling, will apply torque load to the device causing it to grip the rope as described hereinafter more in detail.

On opposite sides of the device, that is, the wheel, are retainer plates preferably generally triangular, pivoted at the center of the side plates or wheel. Between these retainer plates are rollers which serve to retain and guide the safety lines in the peripheral grooves in the side plates. The inner ends of these retainer plates are notched at the position of the removable pin. These retainer plates must be in a predetermined angular position or otherwise the removable pin is locked in position and cannot be removed. They are movable to and from such position, only in the fully unloaded position of the device thus assuring safety.

Whenever a load or tension is on the safety line or lines which rotates the device, that is, the side plates by applying torque thereto, which move the two stems or pins between them, this configurates the rope or line into a locking hitch, wherein the device is locked or secured to the rope and will not move along it. The device can be released controllably and adjusted or released by applying counter torque to the device.

The device has various significant uses and applications as will be made clear hereinafter.

In the light of the foregoing, the objects of the invention include the following:

To provide an improved and simplified, but effective device which is able to lock itself onto a line or rope at any intermediate position without having to thread the line through from an end thereof.

To provide such a device that may be locked onto a line or rope in any position.

To provide a device as referred to in the foregoing which can easily be controllably released for movement from any one location to another. A further object is to provide a device having this characteristic which is very positive in action but yet which has the characteristic that it adapts itself to controllable release and movement.

Another object is to provide a device as in the foregoing, comprising a rotary wheel comprising side plates with pins or stems extending therebetween, one of which is removable for entering the line or rope into the device, the wheel being rotatable by the load line to form a locking hitch in the rope.

Another object is to provide a device as in the foregoing, including means comprising a safety line for rotating the device to lock it and means embodied in the device so that the removable pin is positively and safely locked in position, except in unloaded positions of the device.

Further objects and additional advantages of the invention will become apparent from the following detailed description and annexed drawings wherein:

FIG. 5 is a sectional view taken along the line 5–5 of FIG. 7.

FIG. 6 is a partial view similar to that of FIG. 5 with the removable pin withdrawn for entry of the rope into the device.

FIG. 7 is a sectional view taken along the line 7–7 of FIG. 5.

FIG. 8 is a view similar to that of FIG. 7, showing the device in rope-locking position.

Figure 1:
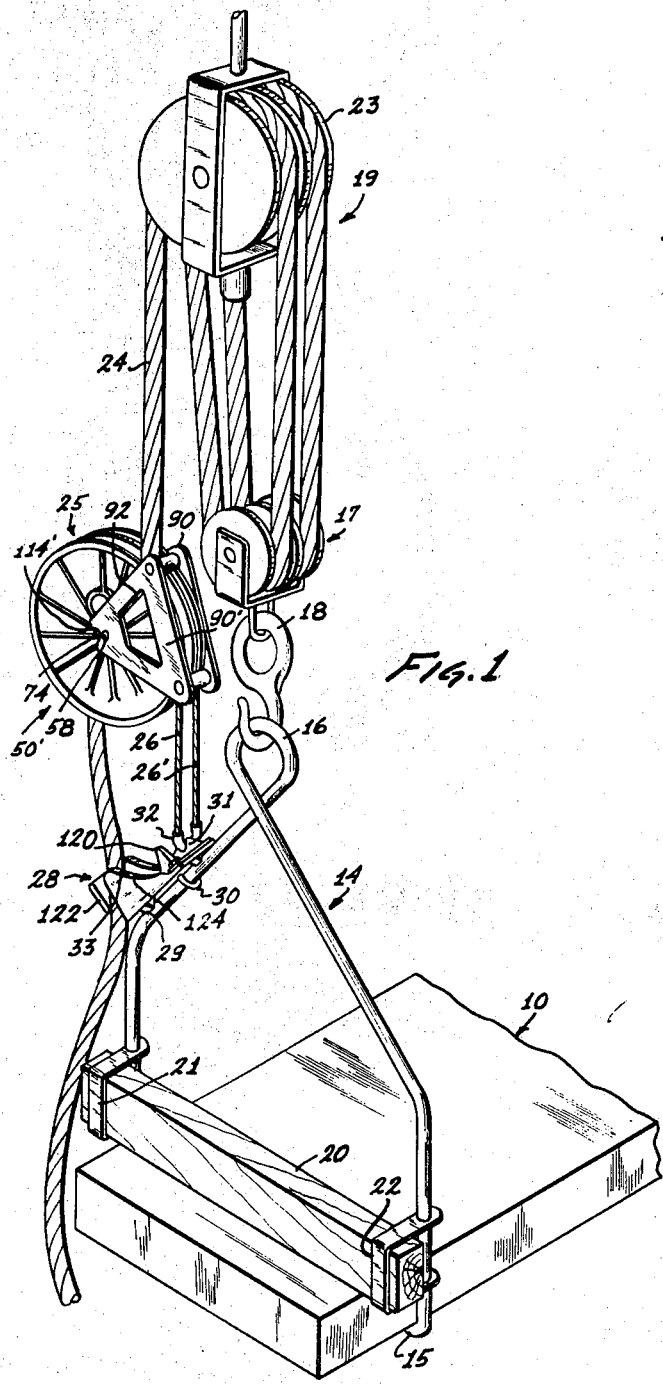
FIG. 1 is a perspective view of a typical application of the invention in connection with a swing stage or platform supported by rope falls.

Referring to FIG. 1 of the drawings numeral 10 designates a platform forming a swing stage supported by rope falls designated generally at 19. The platform or stage 10 is supported at the ends by holding loops, one of which is shown at 14, having a transverse part 15 underneath the stage and an upper looped portion 16 which receives the hook 18 supported by the rope falls 19 and block 17. Over the end of the stage 10 is a transverse wooden member 20 having yokes 21 and 22 at its ends, and these ends have apertures which engage on the upright parts of the support loop 14. The rope falls pass through block 23 supported from overhead, line 24 being the lift line.

The rope-gripping device of the invention is designated generally at 25 in FIG. 1. In the form of the invention shown in FIG. 1 the control lines are the lines 26 and 26′. A load or tension applied to these lines causes the gripping device to grip the rope 24. If the platform or stage 10 is lifted upwardly by pulling down on rope 24 this rotates the device and it moves into the alining and supporting member 28, holding it in position allowing free movement of the hauling line as will be described.

Figure 3:
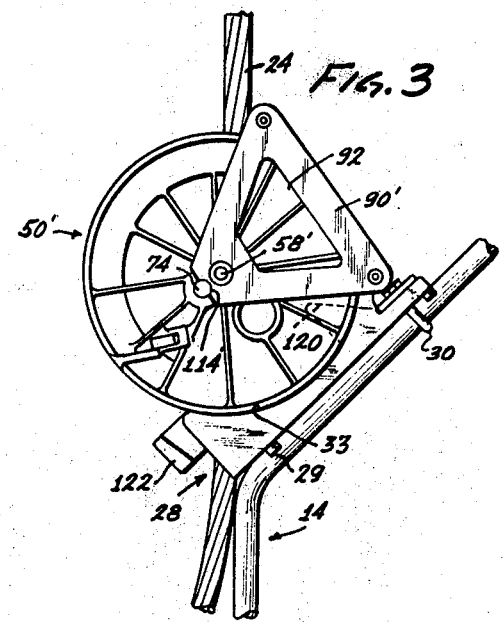
FIG. 3 is a side view of a preferred form of the invention, showing the device nested in its holding bracket.

Member 28 is a holding and stabilizing bracket for the rotary gripping device. This bracket is attachable to one of the diagonal portions of the support loop 14 as shown. Adjacent one end of the bracket 28 are lugs, one of which is shown at 29 which engage against the loop 14. At the other end of the bracket 28 is a U-bolt 30 which engages around a part of loop 14 and it is attached to a bracket or lug 31 which engages the loop 32 at the end of the control lines 26 and 26′. The holding bracket will be described more in detail presently, particularly with respect to its relationship to device 25. FIG. 3 shows it in nested position.

Figure 2:
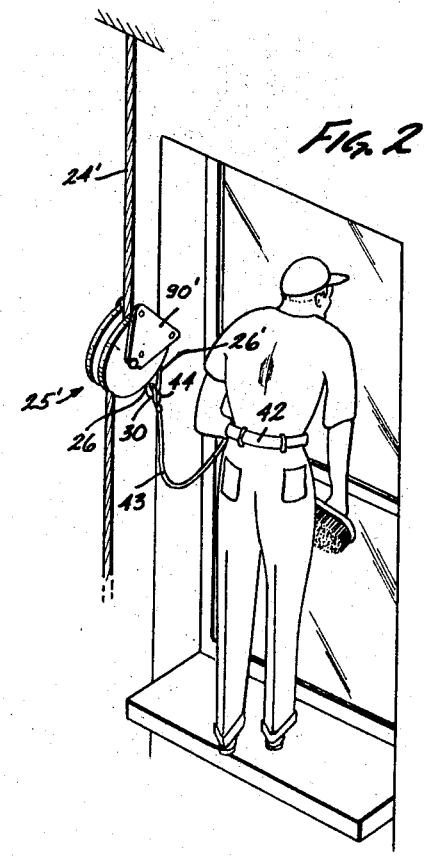
FIG. 2 is an illustration of another typical application of the invention wherein the safety line of the device is attached to a workman's safety belt working on a window ledge at a high elevation.
Figure 4:
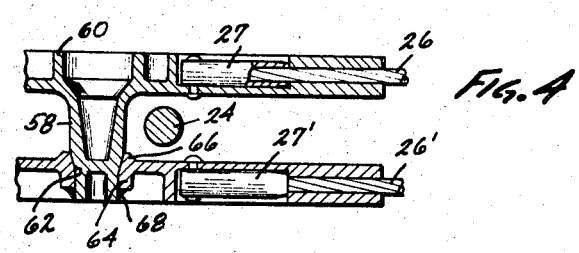
FIG. 4 is a partial sectional view taken along the line 4–4 of FIG. 7.

Referring to FIG. 2, this figure illustrates a workman having a safety belt 42 which is secured to safety line 43 which has a loop 44 at its end which is secured to the control lines 26 and 26′. If the workman falls, the safety line 43 causes device 25 to lock to line 24′ which is securely supported above. Then by pulling himself upwardly where he can reach device 25 he can manually grasp it and apply counterclockwise torque to cause it to controllably release and thereby lower himself gradually and safely.

FIGS. 3 to 8 show a preferred form of the gripping device. In this form of the invention there are provided two similar circular side plates identified generally by the numerals 50 and 50′ having a cross-sectional configuration as may be seen in FIG. 5.

Referring to the side plate 50 which is circular, it has a peripheral web part 52 having a groove 54 in which is received one of the control lines 26. The side plate 50 is embossed inwardly, as may be seen at 56 and at the center of this embossment is the hub 59 which will be referred to again presently. The side plate 50 has an integral inwardly extending projection 58 which is hollow and tapered, and opposite this projection on the other side of the web 50 is an extending flange 60. The plate 50' is similar to the plate 50, except in the following respects. It has a similar extending hub 59' and formed in the embossment 50' is an opening or aperture 62 having a flange 64 on one side of the web 50' and a flange or rib 66 on the opposite side. See FIG. 4. The projection 58 and opening 62 are eccentric with respect to the center of the plates 50 and 50'. The projection 58 extends into and through the opening 62 and is shaped to fit into the flanges on opposite sides of the member 50' and its end is welded to the flange 64 as shown at 68. See FIG. 4. Thus it may be seen that the plates 50 and 50' are secured together.

Numeral 74 designates a pin which extends between the plates 50 and 50' at a position spaced from the projection 58. The web 50 has a bore or opening 76 formed in it, at the end of which is a counterbore 78 of slightly smaller diameter. The embossment 50' has a bore 76' and a counterbore 78'. At one end the pin 74 has a head 80 with a neck 82 of smaller diameter and between this head and the body of the pin 74, around this neck is an O-ring 83. Adjacent to the other end of the pin 74 positioned in an annular groove in it is a snap ring 84 which engages the shoulder at the end of the counterbore 78 when the pin 74 is in position. The pin 74 is partly withdrawable for purposes of entering the line or rope 24 into the device into a position as shown in FIG. 5.

Fig. 6 shows the pin 74 partially withdrawn for purposes of entering the rope 24 into the device. It will be observed that pin 74 cannot be entirely removed and cannot fall out causing possible injury or damage by falling from height.

The device is provided with means for guiding the control lines and for providing safety means for retaining the removable pin in position. In operation as will be described, the side plates 50 and 50' which are preferably circular, rotate in the manner of a wheel to produce the locking hitch in the line or rope 24. As may be seen in FIG. 5 there are side or retainer plates or guide plates 90 and 90'. Preferably these retainer or guide plates are generally triangular with an intermediate opening having a shape as shown at 92 in FIG. 3. The plate 90 is pivotally attached to the hub 59 by way of a screw 94 and washer 96. The retainer or guide plate 90' is similarly pivotally attached to the hub 59 by a screw 94' and washer 96'.

Numeral 100 designates a tubular roller which is rotatably mounted on a tubular stem or pin 102, extending between the retainer or guide plates 90 and 90'. At one end the stem 102 has a neck 104 extending through an aperture 106 in the plate 90 and having a head 108 at its end. At its other end, the pin 102 has a neck 104' fitted in opening 106' in plate 90' and having a head 108'. The roller 100 is at one of the apices of the triangular configuration of the retainer or guide plates 90 and 90' and a second similar roller 100a is provided between two other apices of the retainer plates 90 and 90', these plates being pivoted at their third apices to the wheel formed by the side plates 50 and 50'. The ends of the safety line or lines 26 and 26' are secured to fittings 27 and 27', as may be seen in FIG. 4. These fittings are in turn secured to webs of the circular plates 50 and 50', as may be seen in FIG. 3.

At the apex of the retainer plate 90 adjacent to its point of pivotal mounting it has an arcuate notch 114 and at the corresponding apex of the retainer plate 90' there is a similar arcuate notch 114'. The purpose of these notches or cutouts is that it is only when the retainer guide plates or the assembly formed by the plates 90 and 90' is in a position as shown in FIG. 3, the unloaded condition, that the pin 74 can be withdrawn, this being accommodated by one or the other of the arcuate cutouts 114 and 114'.

FIGS. 1 and 8 show the locked position of the gripping device 25 wherein pin 74 cannot be withdrawn. FIGS. 3 and 7 show the device in unlocked position wherein the plates 90 and 90' are in a position as shown, rotated to an orientation wherein the pin 74 can be removed for entering the rope 24 into the device as seen in FIG. 6. In FIG. 1 there is a load or tension on rope 24 and the control lines 26 and 26'. This load applies torque to the wheel formed by the plates 50 and 50', causing it to rotate in a clockwise direction in the case of FIG. 1; (counterclockwise in FIG. 8). Upon this clockwise rotation, eccentric pins 58 and 74 with the rope 24 between them move from a position such as illustrated by FIG. 7 to a position as illustrated in FIG. 8 which forms a hitch in the rope 24 which is a locking or securing hitch. The locking device 25 is now firmly and securely locked to the rope 24 so that in the case of FIG. 1 the stage or platform is held at any desired level. As may be seen in FIG. 8, the rope 24 bearing against the roller 100 has rotated the plate assembly formed by plates 90 and 90', about its pivot point relatively to the wheel formed by plates 50 and 50' so that the arcuate cutouts 114 and 114' are now not opposite the apertures or bores that receive the pin 74 so that it is now locked in position, and cannot be removed, thereby preventing an unsafe condition in which this pin might be able to come out when the device is locked to the rope 24. Referring to FIG. 1, it will be observed that platform or stage 10 may be raised by hauling on the hauling line (i.e. the part of line 24 below device 25) and the device 20 automatically unlocks by rotating in the opposite direction so that the platform is lifted by the rope falls to any desired level. A man on platform 10 can lower it as desired simply by manually applying counter torque to device 25 to cause it to controllably release and lower the stage as desired.

When the stage is raised by hauling on the lower end of line 24 the device 25 comes into a position in bracket 28 as shown in FIG. 3 where it is held stabilized, the pins 58 and 74 being in a position as shown in FIG. 7 wherein rope 24 can freely pass between them.

The upper surface of the bracket or member 28 is arcuate as shown at 33, having the same radius of curvature as the side members 50 and 50' of the rope gripping device so that it can be brought into a position relative to the bracket as shown in FIG. 3. Numeral 120 designates a projection on the bracket 28 which comes into position between the circular side plates 50 and 50' of the gripping device. At one end of the bracket 28 there is an extending lug 122 spaced from the end of the bracket that line 24 can pass down through and be guided thereby. The bracket 28 is bifurcated as may be seen at 124 in FIG. 1. The projection 120 and the arcuate surfaces 33 guide and position device 25 and hold it for free movement of rope through it.

With the gripping device nested against the bracket 28 as shown in FIG. 3 the gripping device is rotated to an unlocked position such as illustrated in FIG. 7 with the line going substantially straight down through it. With the gripping device in this position the load supported by the rope falls may be raised and movement of the gripping device up the line is facilitated, and in this unlocked position there is no friction against the line.

Figure 11:
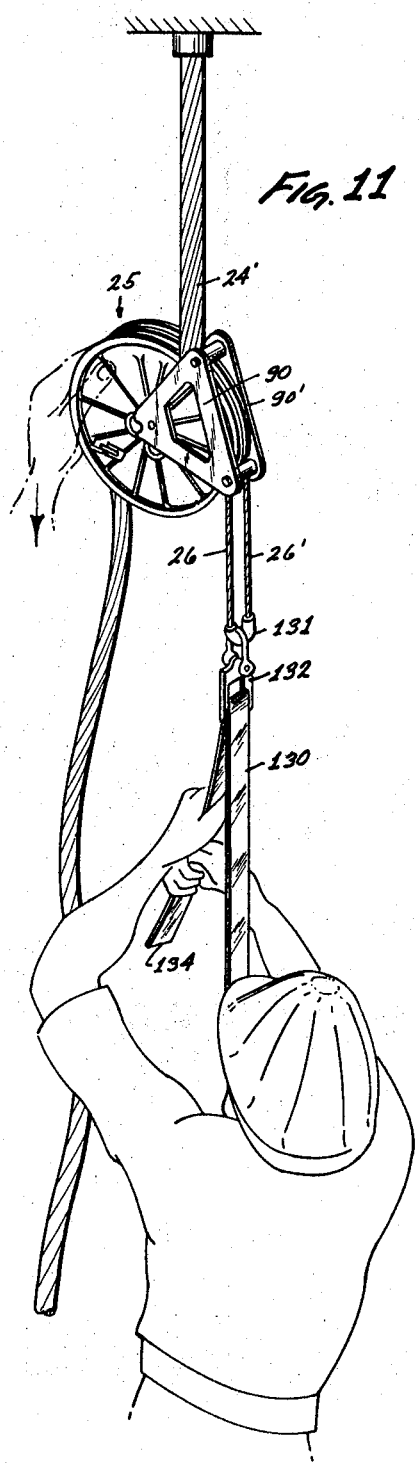
FIG. 11 is a view of a modified life-line arrangement, allowing a man to hoist and maintain himself to an ideal position for operating the device.

FIG. 11 shows another form of the invention adapted for use with a workman having a lifeline attached to his belt. This lifeline in this instance is shown as a web strap 130 similar to the type of straps used in aircraft safety belts. The control lines 26 and 26' are attached to a clevis 131 which is in turn secured to a buckle 132 of the type used on aircraft safety belts. When one end 134 of the safety line or strap 130 is pulled the strap can slip through the buckle and the workman can raise himself an increment at a time, the buckle catching and holding whenever pull on the end 134 is released. In this manner the workman, if he has fallen; can raise himself back up to the gripping device 25 and then merely by grasping it with his left hand and rotating it in a counterclockwise direction can cause it to release controllably; whereby he can lower himself down the line 24'. Ordinarily, the safety line 130 might be perhaps 6 feet long and if a workman fell he would fall this distance. In the manner shown he can raise himself up to the gripping device 25 and then lower himself down the safety line.

As may be observed the device and technique as applied in FIG. 11 may be used in repelling down a mountainside for example.

Figure 9:
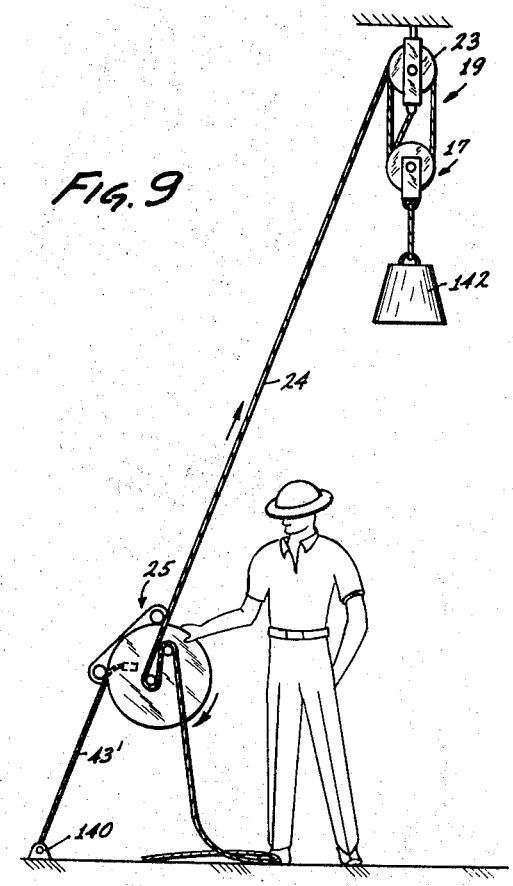
FIG. 9 is a view illustrating another application of the invention.
Figure 10:
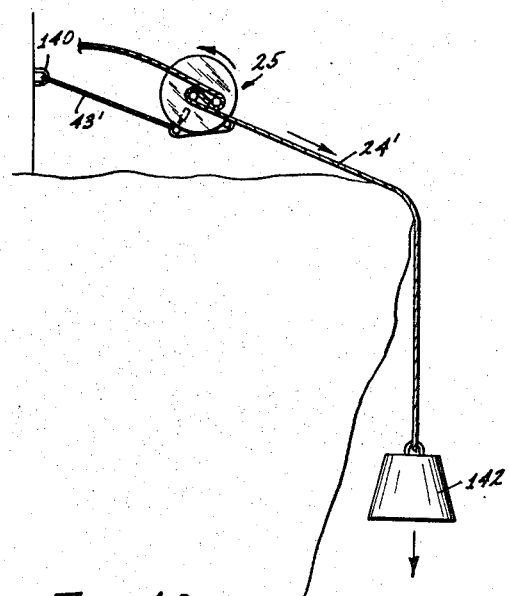
FIG. 10 is a view illustrating a further application of the invention.

FIGS. 9 and 10 illustrate further exemplary uses or applications of the device of the invention. In FIG. 9 the rope 24 and falls correspond to these elements in FIG. 1. In FIG. 9 the control line 43' is anchored as shown at 140. Load in the lines holds device 25 in the position shown wherein an operator can manually and controllably apply releasing torque for lowering a load 142. FIG. 10 shows a similar application wherein load 142 is being lowered over a cliff edge, using a similar technique.

From the foregoing those skilled in the art will readily understand the nature and construction of the invention, its operation, and the manner in which all of the objects and advantages as set forth in the foregoing are realized, as well as the many additional advantages of the invention that are apparent from the detailed description. It provides the maximum in safety and effectiveness for its purpose combined with simplicity, ruggedness and ease of manufacture, maintenance and usage.

The foregoing disclosure is representative of preferred forms of the invention, and is to be interpreted in an illustrative rather than a limiting sense.

I claim:

1. A device for gripping a flexible line such as a rope, comprising:
   a rotatable member having a peripheral portion and spaced transverse members, inwardly of said peripheral portion, on opposite sides of said flexible line; and
   load supporting means connected to said rotatable member eccentric to said spaced members to apply torque thereto to rotate said rotatable member and spaced members in one direction to cause said spaced members to grip said flexible line, said peripheral portion being exposed for manual grasping and for manually applying a counter torque to said rotatable member in the other direction to controllably release the grip of said spaced members on said flexible line.

2. A device as in claim 1 wherein at least one of said spaced members is axially movable in a manner to allow positioning a line between the said members without threading an end of the line between them.

3. A device as in claim 2, including a guide plate having a pivotal mounting on said rotatable member and having a part normally in a position to prevent axial movement of said one spaced member and said guide plate being movable angularly about its pivotal mounting into a position in which axial movement of said one spaced member is permitted.

4. A device as in claim 3, comprising a second similar guide plate attached to the first guide plate to be pivotally movable therewith, said rotatable member being between said guide plates, and guide means carried by said guide plates for guiding load supporting lines with respect to said rotatable member.

5. A device as in claim 3, wherein said guide plate is pivotally mounted at the center of said rotatable member.

6. A device as in claim 1 wherein said rotatable member comprises a pair of circular side plates having said spaced members extending therebetween.

7. A device as in claim 6, wherein said circular side plates have peripheral grooves, said load supporting lines comprising a pair of lines positioned in said peripheral grooves for applying torque.

8. A device as in claim 7 including a bracket attached to the load supporting lines and adapted to be attached to an object to be safely supported, said bracket being configurated to engage and hold the said rotatable member in a stabilized position in which it is unlocked and in a position to freely allow movement of the device upwardly along the flexible line.

9. A device as in claim 7 wherein said load supporting means includes a safety line and holding member having the safety line passing through it and having the characteristics that said line may freely slip through it in one direction with the said member automatically holding the line when moving in the other direction whereby a person supported thereby, who has fallen, can by means of the safety line pull himself up to the said device and then manually controllably release it to lower himself.